2,726,246
Patented Dec. 6, 1955

2,726,246

FLUORESCENT HETEROCYCLIC COMPOUNDS AND PROCESS FOR THEIR MANUFACTURE

Otto Trösken, Frankfurt am Main-Fechenheim, Germany, assignor to Cassella Farbwerke Mainkur Aktiengesellschaft, Frankfurt (Main)-Fechenheim, Germany, a German company No Drawing. Application April 16, 1952,
Serial No. 282,670

Claims priority, application Germany May 2, 1951

5 Claims. (Cl. 260—302)

This invention comprises new fluorescent heterocyclic compounds and a process for their manufacture.

It has been found that fluorescent heterocyclic compounds are obtained by treating aminoketones of the general formula $R(COCH_2NH_2)_n$ with acids or their functional derivatives of the general formula $R(COX)_n$, wherein one of the two $n$'s means the number 1, the other $n$ the number 2; X stands for a group which is exchangeable for the amino group, such as halogen; and R means the same or different, substituted or unsubstituted, hydrocarbon residues, containing one double bond or a plurality of double bonds in a conjugated series, by transforming the acylaminoketones, thus obtained, with condensing agents and, if desired, with agents capable of delivering sulfur or amino groups, into the corresponding bisazoles and, if desired, finally sulfonating the products.

The new compounds thus obtained contain two heterocyclic rings and are distinguished by a series of conjugated double bonds running from the first R to the last one. They correspond to the general formula:

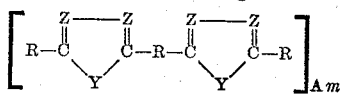

wherein R means the same or different, substituted or unsubstituted hydrocarbon residues containing double bonds in conjugated series; Y stands for —O—, —S—, or —N=; one Z of each ring represents CH, the other Z represents N; A means hydrogen or $SO_3H$, and $m$ stands for the number 1, 2, or 3.

These bisazoles are valuable intermediates for the chemical industry. They may, however, also be used as such owing to their blue fluorescence, especially for brightening up colored or uncolored substances, such as fibre materials, papers, soaps, detergents, ointments.

Example 1

172 parts of hydrochloric ω-amino-acetophenone are dissolved in 1000 parts of glacial acetic acid at 50° C. After cooling to 5° C. and adding 100 parts of anhydrous sodium acetate, there are added at 5–10° C. and during half an hour 103 parts of terephthaloyl chloride. Additional 100 parts of anhydrous sodium acetate are then introduced, followed by stirring for ½ hour at 10° C., and ½ hour at 20–25° C., ½ hour at 40–45° C., and ½ hour at 90–95° C. Having been allowed to cool, the mass is stirred onto 5000 parts of ice and the precipitated substance is filtered off by suction and washed with water. Then stirring with diluted carbonate of soda solution takes place, followed by filtering by suction and washing the residue with water until neutral. After drying the material is recrystallized from dimethylformamide. Thus the terephthaloyl-di-(ω-amino-acetophenone) is obtained in the form of colorless crystals having the melting point 276° C.

10 parts of terephthaloyl-di-(ω-amino-acetophenone) are added at room temperature and in small portions to 100 parts of concentrated sulfuric acid, whereupon the mixture is stirred for one hour at room temperature. Then the mass is poured onto about 500 parts of ice, whereafter the precipitated substance is filtered off by suction and washed with water until neutral. After drying, a light yellowish colored powder is obtained, which has a melting point of 252° C. after being recrystallized from chlorobenzene. The product obtained is the 1.4-di-(5'-phenyl-oxazolyl-2')-benzene having the formula

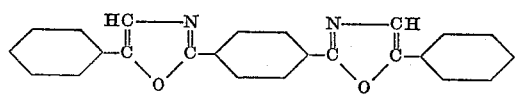

Its solutions in organic solvents show, also in a greater dilution, an intense blue fluorescence.

Example 2

The terephthaloyl-di-(ω-amino-acetophenone) obtained according to Example 1 is introduced into a tenfold quantity of 10% fuming sulfuric acid and stirred for 3–4 hours at 50° C. Having been allowed to cool, the mass is poured onto ice with stirring, and the precipitated product is filtered off by suction. It is a sulfonic acid of 1.4-di-(5'-phenyl-oxazolyl-2')-benzene.

By neutralizing with diluted caustic soda lye and concentrating by evaporation, the sodium salt of this sulfonic acid is obtained as a light yellowish powder, the aqueous solutions of which show, even when greatly diluted, an intense blue fluorescence.

When treating cotton yarn at a liquor ratio of 1:40 at 40° C. during 20 minutes with a solution containing per liter 0.05 gram of the above described sodium salt, the yarn thus treated shows a substantially more beautiful white shade than the untreated yarn.

Example 3

50 parts of terephthaloyl-di-(ω-amino-acetophenone) prepared from 172 parts of hydrochloric ω-aminoacetophenone and 103 parts of terephthaloyl chloride in 500 parts of pyridine at 10° C. with a subsequent heating in an analogous manner as described in Example 1, are mixed with 150 parts of phosphorous pentasulfide, the resulting mixture being heated gradually up to 200–210° C. during about 1 hour. After continuing the heating at 200–210° C. for one additional hour, the mass is allowed to cool and decomposed by adding water and soda solution. The precipitate is filtered by suction, washed with water until neutral and, after drying, recrystallized from chlorobenzene. Thus the 1.4 - di - (5' - phenylthiazolyl-2')-benzene having the formula

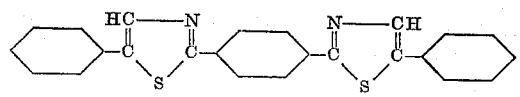

is obtained as yellow crystals of the melting point 235–236° C.

The 1.4-di-(5'-phenyl-thiazolyl-2')-benzene thus obtained is stirred with a tenfold quantity of sulfuric acid monohydrate at 60–65° C. for such a length of time until a sample is soluble in diluted alkali. The sulfonation mixture is worked up as indicated in Example 2, whereby the sodium salt of the sulfonated bis-thiazole is obtained in the form of a yellow powder, which even in greatly diluted aqueous solutions shows a strong blue fluorescence.

When treating, for example, cotton yarn with aqueous solutions of the sulfonation product, the white shade of the treated cotton is considerably improved.

I claim:
1. As new fluorescent heterocyclic compounds the bisazoles corresponding to the general formula:

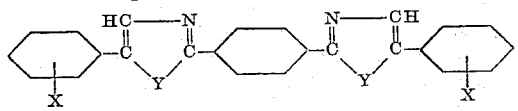

wherein the X's mean radicals of the group consisting of hydrogen, the sulfonic acid group and the alkali salts of the sulfonic acid group and Y stands for a radical of the group consisting of O and S.

2. As a new fluorescent heterocyclic compound, the bisazole of the formula:

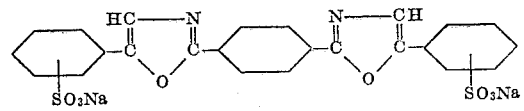

3. As a new fluorescent heterocyclic compound, the bisazole of the formula:

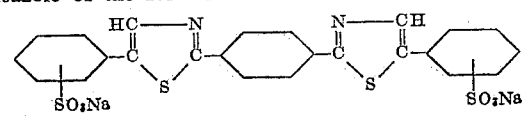

4. As a new fluorescent heterocyclic compound, the bisazole of the formula

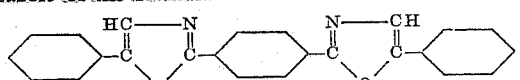

which compound represents a light yellowish colored powder melting at 252° C.

5. As a new fluorescent heterocyclic compound, the bisazole of the formula

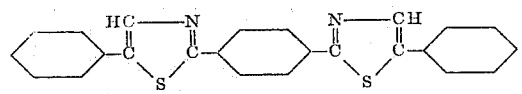

which compound represents yellow crystals melting at 235–236° C.

References Cited in the file of this patent

UNITED STATES PATENTS 2,483,392    Meyer et al. _____ Oct. 4, 1949

OTHER REFERENCES

Erlenmeyer et al.: Helv. Chimica Acta, vol. 27, 1944, pp. 969–70.